United States Patent
Zhou et al.

(10) Patent No.: US 9,252,992 B2
(45) Date of Patent: Feb. 2, 2016

(54) METHOD, APPARATUS AND SYSTEM FOR MULTI-ANTENNA TRANSMISSION

(71) Applicant: HUAWEI TECHNOLOGIES CO., LTD., Shenzhen (CN)

(72) Inventors: Yongxing Zhou, Shenzhen (CN); Jianguo Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/149,439

(22) Filed: Jan. 7, 2014

(65) Prior Publication Data

US 2014/0133601 A1 May 15, 2014

Related U.S. Application Data

(63) Continuation of application No. PCT/CN2012/078379, filed on Jul. 9, 2012.

(30) Foreign Application Priority Data

Jul. 7, 2011 (CN) .......................... 2011 1 0189461

(51) Int. Cl.
*H04L 27/00* (2006.01)
*H04L 25/03* (2006.01)
(Continued)

(52) U.S. Cl.
CPC ........ *H04L 25/03923* (2013.01); *H04B 7/0417* (2013.01); *H04B 7/0456* (2013.01);
(Continued)

(58) Field of Classification Search
CPC .. H04B 7/0639; H04B 7/0456; H04B 7/0478; H04B 7/0617; H04L 25/03898; H04L 25/03961; H04L 25/03343; H04L 1/0026

USPC ........ 375/267, 260, 299, 347, 296, 295, 316, 375/219, 285; 370/329; 455/101
See application file for complete search history.

(56) References Cited

U.S. PATENT DOCUMENTS

2010/0045494 A1   2/2010   Clerckx et al.
2010/0046650 A1*  2/2010   Jongren et al. ................ 375/260
(Continued)

FOREIGN PATENT DOCUMENTS

CN   101577610 A   11/2009
CN   101867447 A   10/2010
(Continued)

OTHER PUBLICATIONS

3GPP, "Study on Downlink MIMO Enhancement for LTE-Advanced" 3GPP Work Item Description, Mar. 2011, 7 pages.
(Continued)

*Primary Examiner* — Leila Malek
(74) *Attorney, Agent, or Firm* — Brinks Gilson & Lione (57) ABSTRACT

Embodiments of the present invention provide a method, an apparatus and a system for multi-antenna transmission, wherein a third precoding matrix determined by a sending end device is a function of a first precoding matrix and a second precoding matrix. That the first precoding matrix has a block diagonal structure and that sub-matrices corresponding to two blocks are Hermitian matrices enable the above-mentioned third precoding matrix to match with a transmit spatial autocorrelation matrix of a cross-polarized antenna or a distributed antenna, thereby enhancing precoding performance and improving system throughput effectively.

16 Claims, 2 Drawing Sheets

(51) Int. Cl.
*H04L 1/06* (2006.01)
*H04B 7/04* (2006.01)
*H04B 7/06* (2006.01)
*H04B 7/08* (2006.01)
*H04B 7/10* (2006.01)

(52) U.S. Cl.
CPC ............ *H04B 7/0469* (2013.01); *H04B 7/0486* (2013.01); *H04B 7/0617* (2013.01); *H04B 7/0619* (2013.01); *H04B 7/0636* (2013.01); *H04B 7/0665* (2013.01); *H04B 7/0842* (2013.01); *H04B 7/10* (2013.01); *H04L 1/06* (2013.01); *H04B 7/0639* (2013.01)

(56) References Cited

U.S. PATENT DOCUMENTS

2010/0215110 A1  8/2010  Onggosanusi et al.
2011/0122968 A1  5/2011  Jöngren et al.
2011/0268204 A1* 11/2011 Choi et al. .................. 375/260
2013/0064128 A1  3/2013  Li et al.
2013/0094464 A1  4/2013  Li et al.

FOREIGN PATENT DOCUMENTS

| CN | 101877627 A | 11/2010 |
|---|---|---|
| CN | 101944979 A | 1/2011 |
| WO | WO 2008/133582 A2 | 11/2008 |
| WO | WO 2010/076778 A1 | 7/2010 |

OTHER PUBLICATIONS

LAN/MAN Standards Committee of the IEEE Computer Society, "WirelessMAN-Advanced Air Interface for Broadband Wireless Access Systems" IEEE P802.16.1™ /D6, Apr. 2012, 1094 pages.

* cited by examiner

METHOD, APPARATUS AND SYSTEM FOR MULTI-ANTENNA TRANSMISSION

CROSS-REFERENCE TO RELATED APPLICATIONS

The application is a continuation of International Application No. PCT/CN2012/078379, filed on Jul. 9, 2012, which claims priority to Chinese Patent Application No. 201110189461.4, filed on Jul. 7, 2011, both of which are hereby incorporated by reference in their entireties.

FIELD OF INVENTION

Embodiments of the present invention relate to communication technologies, and more particularly, to a method, an apparatus and a system for multi-antenna transmission.

BACKGROUND OF THE INVENTION

In multi-antenna transmission of a communication system, such as a long term evolution (Long Term Evolution, LTE for short) system and a long term evolution advanced (Long Term Evolution Advanced, LTE-A for short) system, a user equipment (User Equipment, UE for short) feeds back channel state information (Channel State Information, CSI for short) to a base station, such as an evolved node B (Evolved NodeB, eNB for short). The CSI includes a rank indicator (Rank Indicator, RI for short), a precoding matrix indicator (Precoding Matrix Indicator, PMI for short) and other information, for example, a channel quality indicator (Channel Quality Indicator, CQI for short). The eNB may determine a precoding matrix according to the RI and the PMI fed back by the UE, and precoding data to be transmitted using the precoding matrix. Similar to this, the base station may determine and indicate an RI and a PMI used by the UE for uplink data transmission by measuring an uplink channel.

However, an existing codebook is mainly designed based on a conventional co-located antenna configuration. With regard to a distributed antenna configuration or a large-spacing cross-polarized antenna configuration, a precoding matrix obtained according to the above-mentioned design method can not match with a transmit spatial autocorrelation matrix, thereby resulting in a degradation in precoding performance.

SUMMARY OF THE INVENTION

Embodiments of the present invention provide a method, an apparatus and a system for multi-antenna transmission, so as to enhance precoding performance and improve system throughput.

In one aspect, an embodiment of the present invention provides a method for multi-antenna transmission, including:

selecting, by a receiving end device, a first precoding matrix indicator and a second precoding matrix indicator; and feeding back, by the receiving end device, the first precoding matrix indicator and the second precoding matrix indicator to a sending end device, so that the sending end device determines a third precoding matrix according to the first precoding matrix indicator, the second precoding matrix indicator, and an obtained RI, and precodes data to be transmitted using the third precoding matrix, wherein the third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator.

In another aspect, an embodiment of the present invention provides a method for multi-antenna transmission, including:

receiving, by a sending end device, a first precoding matrix indicator and a second precoding matrix indicator which are fed back by a receiving end device;

determining, by the sending end device, a third precoding matrix according to the first precoding matrix indicator, the second precoding matrix indicator, and an obtained RI, wherein the third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator; and precoding, by the sending end device, data to be transmitted using the third precoding matrix.

In another aspect, an embodiment of the present invention provides an apparatus for multi-antenna transmission, including:

a selecting unit, configured to select a first precoding matrix indicator and a second precoding matrix indicator; and a feedback unit, configured to feed back the first precoding matrix indicator and the second precoding matrix indicator to a sending end device, so that the sending end device determines a third precoding matrix according to the first precoding matrix indicator, the second precoding matrix indicator, and an obtained RI, and precodes data to be transmitted using the third precoding matrix, wherein the third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator.

In another aspect, an embodiment of the present invention provides an apparatus for multi-antenna transmission, including:

a receiving unit, configured to receive a first precoding matrix indicator and a second precoding matrix indicator which are fed back by a receiving end device;

a determining unit, configured to determine a third precoding matrix according to the first precoding matrix indicator, the second precoding matrix indicator, and an obtained RI, wherein the third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator; and a processing unit, configured to precode data to be transmitted using the third precoding matrix.

In another aspect, an embodiment of the present invention provides a system for multi-antenna transmission, including:

a receiving end device, configured to select a first precoding matrix indicator and a second precoding matrix indicator and feed back the first precoding matrix indicator and the second precoding matrix indicator; and a sending end device, configured to receive the first precoding matrix indicator and the second precoding matrix indicator which are fed back by the receiving end device, determine a third precoding matrix according to the first precoding matrix indicator, the second precoding matrix indicator, and an obtained RI, and precode data to be transmitted using the third precoding matrix, wherein the third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator.

It can be seen from the above-mentioned technical solutions that, in the embodiments of the present invention, since the third precoding matrix is a function of the first precoding matrix and the second precoding matrix, the first precoding matrix has a block diagonal structure and sub-matrices corresponding to two blocks are Hermitian matrices, the above-mentioned third precoding matrix is enabled to match with a transmit spatial autocorrelation matrix of a cross-polarized antenna or a distributed antenna, thereby enhancing precoding performance and improving system throughput effectively.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings can be obtained by the persons of ordinary skill in the art without any creative effort.

EMBODIMENTS OF THE INVENTION

To make objectives, technical solutions and advantages of embodiments of the present invention clearer, a clear and complete description of technical solutions of the embodiments of the present invention will be given below, in combination with the accompanying drawings in the embodiments of the present invention. Apparently, the embodiments described below are a part, but not all, of the embodiments of the present invention. All of other embodiments, obtained by those skilled in the art based on the embodiments of the present invention without any inventive efforts, fall into the protection scope of the present invention.

Figure 1:
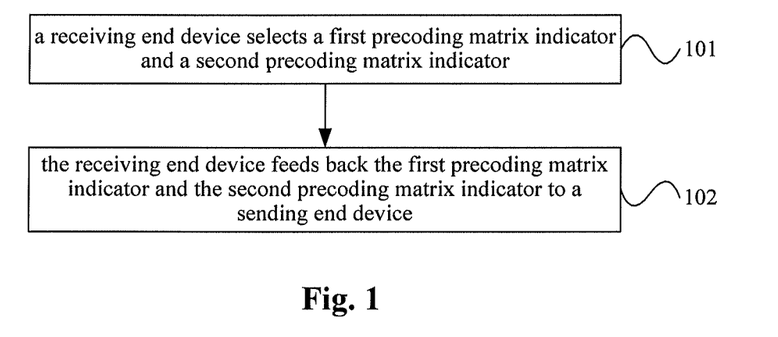
FIG. 1 is a schematic flowchart of a method for multi-antenna transmission provided by an embodiment of the present invention.

FIG. 1 is a schematic flowchart of a method for multi-antenna transmission provided by an embodiment of the present invention. As shown in FIG. 1, the method for multi-antenna transmission of the present embodiment may include:

101. a receiving end device selects a first precoding matrix indicator and a second precoding matrix indicator; and 102. the receiving end device feeds back the first precoding matrix indicator and the second precoding matrix indicator to a sending end device, so that the sending end device determines a third precoding matrix according to the first precoding matrix indicator, the second precoding matrix indicator, and an obtained RI, and precodes data to be transmitted using the third precoding matrix.

The third precoding matrix is a function of a first precoding matrix and a second precoding matrix, for example, the third precoding matrix is a product of the first precoding matrix and the second precoding matrix. The first precoding matrix has a block diagonal structure, and each block is a Hermitian matrix. The first precoding matrix is identified by the first precoding matrix indicator, and the second precoding matrix is identified by the second precoding matrix indicator.

For example, for a 4-transmit-antenna configuration, a block sub-matrix of the first precoding matrix is R1, and another block sub-matrix of the first precoding matrix is R2, wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix}.$$

The first precoding matrix has a block diagonal structure, enabling a precoding matrix to match with a transmit spatial autocorrelation matrix of a distributed antenna or a large-spacing cross-polarized antenna, thereby obtaining better precoding performance.

Alternatively, values of θ−2kπ or values of φ−2kπ are uniformly quantized from $$-\frac{\pi}{N} \text{ to } +\frac{\pi}{N},$$

k is an integer and N is a positive integer, namely 1, 2, 3, 4, and so on, which may effectively cover a quantization space or reduce a quantization range, thereby reducing feedback overhead.

Alternatively, a value of θ is different from a value of φ, which may be suitable to a transmit spatial correlation matrix of a large-spacing cross-polarized antenna or a distributed antenna, and can enhance precoding performance, thereby improving system throughput.

Alternatively, a value of θ may also be the same as a value of φ, which may be suitable to a transmit spatial correlation matrix of a small-spacing cross-polarized antenna or a co-located antenna, and can enhance precoding performance, thereby improving system throughput.

Alternatively, the third precoding matrix determined in the present embodiment may be a matrix obtained by orthonormalizing a product of the first precoding matrix and the second precoding matrix, which can avoid inter-layer interference as possible.

Alternatively, the third precoding matrix determined in the present embodiment may be is a matrix obtained by multiplying a matrix which is obtained by orthonormalizing a product of the first precoding matrix and the second precoding matrix by a factor, for example, the factor may be $r^{1/2}$, wherein a value of r is the RI, which can realize that the same power of each layer after precoding and ensure a constant total transmit power.

To make the method provided by the embodiment of the present invention clearer, 4 transmit antennae are taken as an example below. The PMIs corresponding to the first precoding matrix and the second precoding matrix may be written as $i_1$ and $i_2$ respectively, the first precoding matrix may be written as $R_{i_1}$, a sub-matrix corresponding to a block of $R_{i_1}$ is written as $R_{1,i_1}$, a sub-matrix corresponding to another block of $R_{i_1}$, is written as $R_{2,i_1}$, and the second precoding matrix may be written as $W_{i_2}^{(r)}$. The orthonormalized third precoding matrix may be written as $F_{i_1,i_2}^{(r)}$, which may be expressed as follows:

$$F_{i_1,i_2}^{(r)} = norm(R_{i_1}, W_{i_2}^{(r)}), R_{i_1} = \text{diag}\{R_{1,i_1}, R_{2,i_1}\};$$

$$R_{i_1} = \begin{bmatrix} 1 & e^{-j\theta} \\ e^{j\theta} & 1 \end{bmatrix}, R_{2,i_1} = \begin{bmatrix} 1 & e^{-j\varphi} \\ e^{j\varphi} & 1 \end{bmatrix}.$$

$W_{i_2}^{(r)}$; may be a precoding matrix in any codebook in the prior art, the detailed contents of which may be referred to relevant contents in the prior art.

Alternatively, to further realize the same power of each layer after precoding and ensure a constant total transmit power, the orthonormalized $F_{i_1,i_2}^{(r)}$, may be further expressed as follows:

$$F_{i_1,i_2}^{(r)} = r^{-\frac{1}{2}} norm(R_{i_1}, W_{i_2}^{(r)}).$$

In the present embodiment, since the third precoding matrix is a function of the first precoding matrix and the second precoding matrix, the first precoding matrix has a block diagonal structure and sub-matrices corresponding to two blocks are Hermitian matrices, the above-mentioned third precoding matrix is enabled to match with a transmit spatial autocorrelation matrix of a cross-polarized antenna or a distributed antenna, thereby enhancing precoding performance and improving system throughput effectively.

Figure 2:
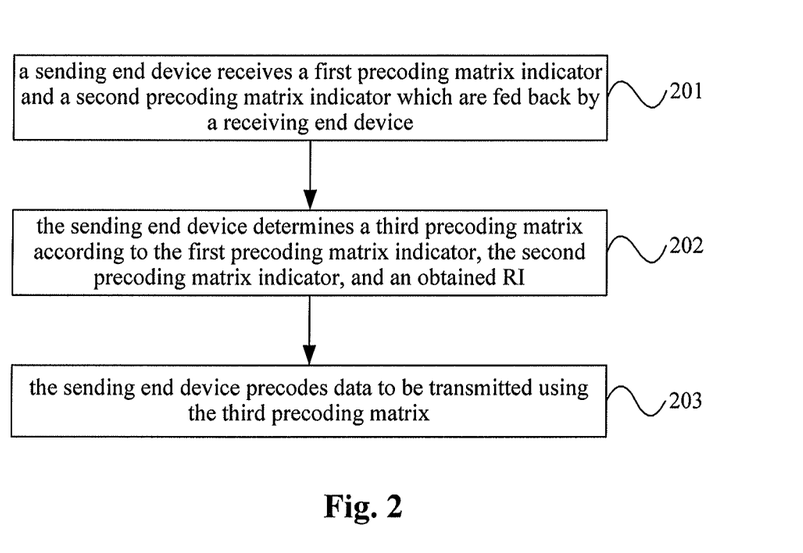
FIG. 2 is a schematic flowchart of a method for multi-antenna transmission provided by another embodiment of the present invention.

FIG. 2 is a schematic flowchart of a method for multi-antenna transmission provided by another embodiment of the present invention. As shown in FIG. 2, the method for multi-antenna transmission of the present embodiment may include:

201. a sending end device receives a first precoding matrix indicator and a second precoding matrix indicator which are fed back by a receiving end device;

202. the sending end device determines a third precoding matrix according to the first precoding matrix indicator, the second precoding matrix indicator, and an obtained RI, wherein the third precoding matrix is a function of a first precoding matrix and a second precoding matrix, for example, the third precoding matrix is a product of the first precoding matrix and the second precoding matrix, the first precoding matrix has a block diagonal structure, each block is a Hermitian matrix, the first precoding matrix is identified by the first precoding matrix indicator, and the second precoding matrix is identified by the second precoding matrix indicator; and 203. the sending end device precodes data to be transmitted using the third precoding matrix.

For example, for a 4-transmit-antenna configuration, a block sub-matrix of the first precoding matrix is R1, and another block sub-matrix of the first precoding matrix is R2, wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix}.$$

The first precoding matrix has a block diagonal structure, enabling a precoding matrix to match with a transmit spatial autocorrelation matrix of a distributed antenna or a large-spacing cross-polarized antenna, thereby obtaining better precoding performance.

Alternatively, values of $\theta-2k\pi$ or values of $\varphi-2k\pi$ are uniformly quantized from $$-\frac{\pi}{N} \text{ to } +\frac{\pi}{N},$$

k is an integer and N is a positive integer, namely 1, 2, 3, 4, and so on, which may effectively cover a quantization space or reduce a quantization range, thereby reducing feedback overhead.

Alternatively, a value of $\theta$ is different from a value of $\varphi$, which may be suitable to a transmit spatial correlation matrix of a large-spacing cross-polarized antenna or a distributed antenna, and can enhance precoding performance, thereby improving system throughput.

Alternatively, a value of $\theta$ may also be the same as a value of $\varphi$, which may be suitable to a transmit spatial correlation matrix of a small-spacing cross-polarized antenna or a co-located antenna, and can enhance precoding performance, thereby improving system throughput.

Alternatively, the third precoding matrix determined in the present embodiment may be a matrix obtained by orthonormalizing a product of the first precoding matrix and the second precoding matrix, which can avoid inter-layer interference as possible.

Alternatively, the third precoding matrix determined in the present embodiment may be is a matrix obtained by multiplying a matrix which is obtained by orthonormalizing a product of the first precoding matrix and the second precoding matrix by a factor, for example, the factor may be $$r^{-\frac{1}{2}},$$

wherein a value of r is the RI, which can realize the same power of each layer after precoding and ensure a constant total transmit power.

To make the method provided by the embodiment of the present invention clearer, relevant contents may be referred to those of the example of 4-transmit-antenna in the embodiment corresponding to FIG. 1.

In the present embodiment, since the third precoding matrix is a function of the first precoding matrix and the second precoding matrix, the first precoding matrix has a block diagonal structure and sub-matrices corresponding to two blocks are Hermitian matrices, the above-mentioned third precoding matrix is enabled to match with a transmit spatial autocorrelation matrix of a cross-polarized antenna or a distributed antenna, thereby enhancing precoding performance and improving system throughput effectively.

It should be appreciated that technical solutions of the present invention may be applied to various kinds of communication systems, for example, a long term evolution (Long Term Evolution, LTE for short) system, a long term evolution advanced (Long Term Evolution Advanced, LTE-A for short) system and so on.

A sending end device may be a UE in the LTE system or the LTE-A system; accordingly, a receiving end device may be an eNB or a relay node in the LTE system or the LTE-A system. A sending end device may also be an eNB in the LTE system or the LTE-A system; accordingly, a receiving end device may also be a UE or a relay node in the LTE system or the LTE-A system. A sending end device may be a relay node in the LTE system or the LTE-A system; accordingly, a receiving end device may be an eNB or a UE in the LTE system or the LTE-A system. The embodiments of the present invention set no limitation to the sending end device or the receiving end device.

It should be noted that, in order to make the description simple, the preceding respective method embodiments are described as combinations of a series of acts, while it should be known to those skilled in the art that the present invention is not limited by the order of acts, as some steps, according to the present invention, may be executed in other orders or concurrently. In addition, it should be also known to those skilled in the art that the embodiments described in the description are preferable ones, and the involved acts and modules thereof are not necessarily essential in the present invention.

In the above-mentioned embodiments, the descriptions of the respective embodiments have different emphases. The parts which are not described in detail in one embodiment may be referred to relevant description of other embodiments.

Figure 3:
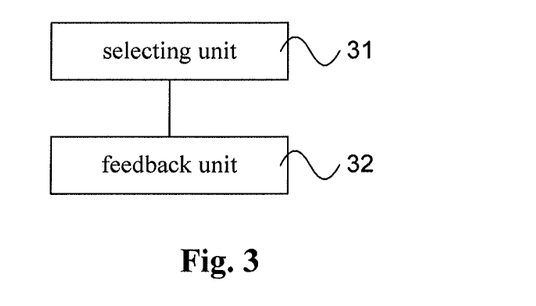
FIG. 3 is a schematic diagram of a structure of an apparatus for multi-antenna transmission provided by another embodiment of the present invention.

FIG. 3 is a schematic diagram of a structure of an apparatus for multi-antenna transmission provided by another embodiment of the present invention. As shown in FIG. 3, the apparatus for multi-antenna transmission of the present embodiment may include a selecting unit 31 and a feedback unit 32. The selecting unit 31 is configured to select a first precoding matrix indicator and a second precoding matrix indicator; and the feedback unit 32 is configured to feed back the first precoding matrix indicator and the second precoding matrix indicator to a sending end device, so that the sending end device determines a third precoding matrix according to the first precoding matrix indicator, the second precoding matrix indicator, and an obtained RI, and precodes data to be transmitted using the third precoding matrix.

The third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator.

Functions of the receiving end device in the embodiment corresponding to FIG. 1 are implemented by the apparatus for multi-antenna transmission provided by the present embodiment.

A sub-matrix corresponding to a block of the first precoding matrix identified by the first precoding matrix indicator selected by the selecting unit 31 is R1, and a sub-matrix corresponding to another block of the first precoding matrix 31 is R2, wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix}.$$

The first precoding matrix has a block diagonal structure, enabling a precoding matrix to match with a transmit spatial autocorrelation matrix of a distributed antenna or a large-spacing cross-polarized antenna, thereby obtaining better precoding performance.

Alternatively, in the sub-matrix R1 corresponding to a block of the first precoding matrix identified by the first precoding matrix indicator selected by the selecting unit 31, values of θ−2kπ or values of φ−2kπ are uniformly quantized from $$-\frac{\pi}{N} \text{ to } +\frac{\pi}{N},$$

k is an integer and N is a positive integer, which may effectively cover a quantization space or reduce a quantization range, thereby reducing feedback overhead.

Alternatively, a value of the θ in the sub-matrix R1 corresponding to a block of the first precoding matrix identified by the first precoding matrix indicator selected by the selecting unit 31 is the same as a value of the φ, which may be suitable to a transmit spatial correlation matrix of a small-spacing cross-polarized antenna or a co-located antenna, and can enhance precoding performance, thereby improving system throughput.

In the present embodiment, since the third precoding matrix is a function of the first precoding matrix and the second precoding matrix, the first precoding matrix has a block diagonal structure and sub-matrices corresponding to two block are Hermitian matrices, the above-mentioned third precoding matrix is enabled to match with a transmit spatial autocorrelation matrix of a cross-polarized antenna or a distributed antenna, thereby enhancing precoding performance and improving system throughput effectively.

Figure 4:
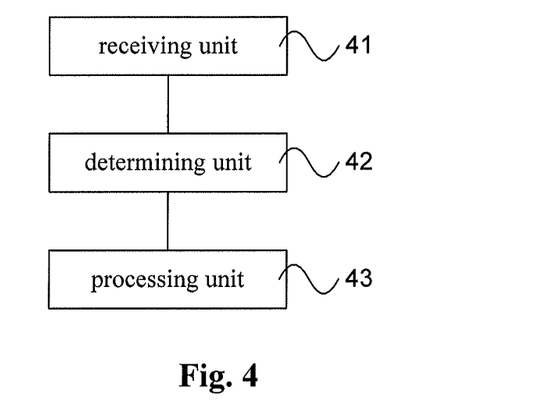
FIG. 4 is a schematic diagram of a structure of an apparatus for multi-antenna transmission provided by another embodiment of the present invention.

FIG. 4 is a schematic diagram of a structure of an apparatus for multi-antenna transmission provided by another embodiment of the present invention. As shown in FIG. 4, the apparatus for multi-antenna transmission of the present embodiment may include a receiving unit 41, a determining unit 42 and a processing unit 43. The receiving unit 41 is configured to receive a first precoding matrix indicator and a second precoding matrix indicator which are fed back by a receiving end device; the determining unit 42 is configured to determine a third precoding matrix according to the first precoding matrix indicator, the second precoding matrix indicator, and an obtained RI; and the processing unit 43 is configured to precode data to be transmitted using the third precoding matrix.

The third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator.

Functions of the sending end device in the embodiment corresponding to FIG. 2 are implemented by the apparatus for multi-antenna transmission provided by the present embodiment.

A sub-matrix corresponding to a block of the first precoding matrix identified by the first precoding matrix indicator received by the receiving unit 41 is R1, and a sub-matrix corresponding to another block of the first precoding matrix is R2,
wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix}.$$

The first precoding matrix has a block diagonal structure, enabling a precoding matrix to match with a transmit spatial autocorrelation matrix of a distributed antenna or a large-spacing cross-polarized antenna, thereby obtaining better precoding performance.

Alternatively, in the sub-matrix R1 corresponding to a block of the first precoding matrix identified by the first precoding matrix indicator received by the receiving unit 41, values of θ−2kπ or values of φ−2kπ are uniformly quantized from $$-\frac{\pi}{N} \text{ to } +\frac{\pi}{N},$$

k is an integer and N is a positive integer, which may effectively cover a quantization space or reduce a quantization range, thereby reducing feedback overhead.

Alternatively, a value of θ in the sub-matrix R1 corresponding to a block of the first precoding matrix identified by the first precoding matrix indicator received by the receiving unit 41 is the same as a value of φ, which is applicable to a transmit spatial correlation matrix of a small-spacing cross-polarized antenna or a co-located antenna, and can enhance precoding performance, thereby improving system throughput.

Specifically, the third precoding matrix, determined by the determining unit 42 in the present embodiment according to the first precoding matrix indicator, the second precoding matrix indicator, and the obtained RI, may be a product of the first precoding matrix and the second precoding matrix; or may also be a matrix obtained by orthonormalizing a product of the first precoding matrix and the second precoding matrix; or may also be a matrix obtained by multiplying a matrix which is obtained by orthonormalizing a product of the first precoding matrix and the second precoding matrix by a factor.

In the present embodiment, since the third precoding matrix determined by the determining unit 42 is a function of the first precoding matrix and the second precoding matrix, the first precoding matrix having a block diagonal structure and sub-matrices corresponding to two blocks being Hermitian matrices, the above-mentioned third precoding matrix is enabled to match with a transmit spatial autocorrelation matrix of a cross-polarized antenna or a distributed antenna, thereby enhancing precoding performance and improving system throughput effectively.

Figure 5:
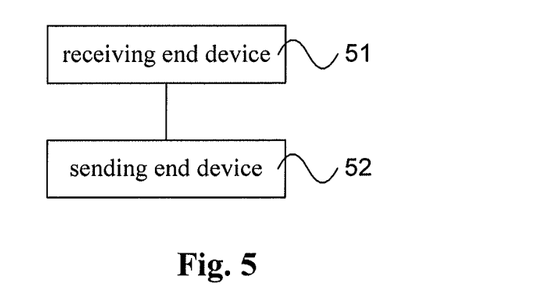
FIG. 5 is a schematic diagram of a structure of a system for multi-antenna transmission provided by another embodiment of the present invention.

FIG. 5 is a schematic diagram of a structure of a system for multi-antenna transmission provided by another embodiment of the present invention. As shown in FIG. 5, the system for multi-antenna transmission of the present embodiment may include a receiving end device 51 and a sending end device 52. The receiving end device 51 is configured to select a first precoding matrix indicator and a second precoding matrix indicator and feed back the first precoding matrix indicator and the second precoding matrix indicator; and the sending end device 52 is configured to receive the first precoding matrix indicator and the second precoding matrix indicator which are fed back by the receiving end device 51, determine a third precoding matrix according to the first precoding matrix indicator, the second precoding matrix indicator, and an obtained RI, and precode data to be transmitted using the third precoding matrix.

The third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator.

Functions of the receiving end device in the embodiment corresponding to FIG. 1 are implemented by the receiving end device 51 in the system for multi-antenna transmission provided by the present embodiment; and functions of the sending end device in the embodiment corresponding to FIG. 2 are implemented by the sending end device 52 in the system for multi-antenna transmission provided by the present embodiment.

A sub-matrix corresponding to a block of the first precoding matrix identified by the first precoding matrix indicator received by the sending end device 52 is R1, and a sub-matrix corresponding to another block of the first precoding matrix is R2,
wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix}.$$

The first precoding matrix has a block diagonal structure, enabling a precoding matrix to match with a transmit spatial autocorrelation matrix of a distributed antenna or a large-spacing cross-polarized antenna, thereby obtaining better precoding performance.

Alternatively, in the sub-matrix R1 corresponding to a block of the first precoding matrix identified by the first precoding matrix indicator received by the sending end device 52, values of θ−2kπ or values of φ−2kπ are uniformly quantized from $$-\frac{\pi}{N} \text{ to } +\frac{\pi}{N},$$

k is an integer and N is a positive integer, which may effectively cover a quantization space or reduce a quantization range, thereby reducing feedback overhead.

Alternatively, a value of θ in the sub-matrix R1 corresponding to a block of the first precoding matrix identified by the first precoding matrix indicator received by the sending end device 52 is the same as a value of φ, which is applicable to a transmit spatial correlation matrix of a small-spacing cross-polarized antenna or a co-located antenna, and can enhance precoding performance, thereby improving system throughput.

Specifically, the third precoding matrix, determined by the sending end device according to the first precoding matrix indicator, the second precoding matrix indicator, and the obtained RI, may be a product of the first precoding matrix and the second precoding matrix; or may also be a matrix obtained by orthonormalizing a product of the first precoding matrix and the second precoding matrix; or may also be a matrix obtained by multiplying a matrix which is obtained by orthonormalizing a product of the first precoding matrix and the second precoding matrix by a factor.

In the present embodiment, since the third precoding matrix determined by the sending end device is a function of the first precoding matrix and the second precoding matrix, the first precoding matrix has a block diagonal structure and sub-matrices corresponding to two blocks are Hermitian matrices, the above-mentioned third precoding matrix is enabled to match with a transmit spatial autocorrelation matrix of a cross-polarized antenna or a distributed antenna, thereby enhancing precoding performance and improving system throughput effectively.

It may be understood clearly for those skilled in the art that, for convenience and simplicity of the description, specific work processes of the above-mentioned system, apparatus and units may be referred to the corresponding processes in the preceding embodiments of a method, and will not be described redundantly herein.

It should be appreciated that, in some embodiments provided by the present application, the disclosed system, apparatus and methods may be implemented in other manners. For example, the apparatus embodiments described above are just illustrative. For example, the division of units is just a division of logical functions, and there may be other division manners for practical implementations. For example, multiple units or components may be combined or integrated into another system, or some features may be ignored or may not be performed. At another point, the displayed or discussed mutual coupling or direct coupling or communication link may be indirect coupling or communication link through some interfaces, devices or units, which may be in an electrical form, a mechanical form or other forms.

The units described as separated parts may be or may not be physically separated, and the parts displayed as units may be or may not be physical units, which may be located in one place or distributed to multiple network elements. Part or all units therein may be selected to implement the objectives of solutions of the present embodiments according to the actual demands.

In addition, in the respective embodiments of the present invention, various functional units may be integrated into one processing unit, or each unit may separately exist physically, or two or more units may be integrated into one unit. The above-mentioned integrated unit may be implemented in a form of hardware, or may also be implemented in a form of hardware plus software function unit.

The integrated unit implemented in a form of software functional unit may be stored in a computer readable storage medium. The above-mentioned software functional unit stored in a storage medium includes some instructions that enable computer equipment (may be a personal computer, a server, or network equipment) to execute part of steps of the methods described in the respective embodiments of the present invention. The preceding storage medium includes various kinds of medium that may store program codes, such as a U disk, a removable hard disk, a read-only memory (Read-Only Memory, ROM for short), a random access memory (Random Access Memory, RAM for short), a magnetic disk, an optical disk, or the like.

In the end, it should be noted that the preceding embodiments are only used to illustrate the technical solutions of the present invention rather than limiting the present invention; though the present invention is illustrated in detail by referring to the preceding embodiments, it should be understood by those of ordinary skill in the art that modifications may still be made on the technical solutions disclosed in the preceding respective embodiments, or equivalent alterations may be made to a part of technical characteristics thereof; and these modifications or alterations do not make the nature of corresponding technical solutions departure from the spirit and scope of the technical solutions of the respective embodiments of the present invention.

What is claimed is:

1. A method for multi-antenna transmission, comprising:
    selecting, by a receiving end device, a first precoding matrix indicator which identifies a first precoding matrix having a block diagonal structure in which each block is a Hermitian matrix and a second precoding matrix indicator; and
    feeding back, by the receiving end device, the first precoding matrix indicator and the second precoding matrix indicator to a sending end device, so that the sending end device determines a third precoding matrix according to the first precoding matrix indicator, the second precoding matrix indicator, and an obtained rank indicator (RI), and precodes data to be transmitted using the third precoding matrix,
    wherein the third precoding matrix is a function of the first precoding matrix and a second precoding matrix, and the second precoding matrix is identified by the second precoding matrix indicator, and a sub-matrix corresponding to a block of the first precoding matrix is R1, and a sub-matrix corresponding to another block of the first precoding matrix is R2,
    wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix},$$

where $\theta$ and $\varphi$ represent angular values, where $\theta - 2k\pi$ and $\varphi - 2k\pi$ are uniformly quantized between $$-\frac{\pi}{N} \text{ to } +\frac{\pi}{N},$$

where k is an integer and N is a positive non-zero integer.

2. The method according to claim 1, wherein a value of the $\theta$ is the same as a value of the $\varphi$.

3. The method according to claim 1, wherein that the third precoding matrix is a function of a first precoding matrix and a second precoding matrix comprises:
    the third precoding matrix is a product of the first precoding matrix and the second precoding matrix.

4. The method according to claim 1, wherein that the third precoding matrix is a function of a first precoding matrix and a second precoding matrix comprises:
    the third precoding matrix is a matrix obtained by orthonormalizing a product of the first precoding matrix and the second precoding matrix.

5. The method according to claim 1, wherein that the third precoding matrix is a function of a first precoding matrix and a second precoding matrix comprises:
    the third precoding matrix is a matrix obtained by multiplying a matrix which is obtained by orthonormalizing a product of the first precoding matrix and the second precoding matrix by a factor.

6. A method for multi-antenna transmission, comprising:
receiving, by a sending end device, a first precoding matrix indicator and a second precoding matrix indicator which are fed back by a receiving end device;
determining, by the sending end device, a third precoding matrix according to the first precoding matrix indicator, the second precoding matrix indicator, and an obtained rank indicator (RI), wherein the third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator; and
precoding, by the sending end device, data to be transmitted using the third precoding matrix, a sub-matrix corresponding to a block of the first precoding matrix is R1, and a sub-matrix corresponding to another block of the first precoding matrix is R2,
wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix},$$

where $\theta$ and $\varphi$ represent angular values, where $\theta-2k\pi$ and $\varphi-2k\pi$ are uniformly quantized between $$-\frac{\pi}{N} \text{ to } +\frac{\pi}{N},$$

where k is an integer and N is a positive non-zero integer.

7. The method according to claim 6, wherein a value of the $\theta$ is the same as a value of the $\varphi$.

8. The method according to claim 6, wherein that the third precoding matrix is a function of a first precoding matrix and a second precoding matrix comprises:
the third precoding matrix is a product of the first precoding matrix and the second precoding matrix.

9. The method according to claim 6, wherein that the third precoding matrix is a function of a first precoding matrix and a second precoding matrix comprises:
the third precoding matrix is a matrix obtained by orthonormalizing a product of the first precoding matrix and the second precoding matrix.

10. The method according to claim 6, wherein that the third precoding matrix is a function of a first precoding matrix and a second precoding matrix comprises:
the third precoding matrix is a matrix obtained by multiplying a matrix which is obtained by orthonormalizing a product of the first precoding matrix and the second precoding matrix by a factor.

11. An apparatus for multi-antenna transmission, comprising:
a processor configured to select a first precoding matrix indicator which identifies a first precoding matrix having a block diagonal structure in which each block is a Hermitian matrix and a second precoding matrix indicator which identifies a second precoding matrix, wherein a sub-matrix corresponds to a block of the first precoding matrix identified by the first precoding matrix indicator selected by the processor is R1, and a sub-matrix corresponds to another block of the first precoding matrix is R2,
wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix},$$

where $\theta$ and $\varphi$ represent angular values, where $\theta-2k\pi$ and $\varphi-2k\pi$ are uniformly quantized between $$-\frac{\pi}{N} \text{ to } +\frac{\pi}{N},$$

where k is an integer and N is a positive non-zero integer; and
a transmitter configured to feed back the first precoding matrix indicator and the second precoding matrix indicator to a sending end device, so that the sending end device determines a third precoding matrix according to the first precoding matrix indicator, the second precoding matrix indicator, and an obtained rank indicator (RI), and precodes data to be transmitted using the third precoding matrix,
wherein the first precoding matrix and the second precoding matrix are used for determining the third precoding matrix which is a function of the first precoding matrix and the second precoding matrix.

12. The apparatus according to claim 11, wherein a value of the $\theta$ is the same as a value of the $\varphi$.

13. An apparatus for multi-antenna transmission, comprising:
a receiver configured to receive a first precoding matrix indicator and a second precoding matrix indicator which are fed back by a receiving end device;
a processor configured to determine a third precoding matrix according to the first precoding matrix indicator, the second precoding matrix indicator, and an obtained rank indicator (RI), wherein the third precoding matrix is a function of a first precoding matrix and a second precoding matrix, the first precoding matrix has a block diagonal structure, each block is a Hermitian matrix, the first precoding matrix is identified by the first precoding matrix indicator, and the second precoding matrix is identified by the second precoding matrix indicator, wherein the processor is further configured to precode data to be transmitted using the third precoding matrix, and a sub-matrix corresponding to a block of the first precoding matrix identified by the first precoding matrix indicator received by the receiver is R1, and a sub-matrix corresponding to another block of the first precoding matrix is R2,
wherein $$R1 = \begin{bmatrix} 1 & e^{-j\theta} \\ e^{j\theta} & 1 \end{bmatrix}, R2 = \begin{bmatrix} 1 & e^{-j\varphi} \\ e^{j\varphi} & 1 \end{bmatrix},$$

where $\theta$ and $\varphi$ represent angular values, where $\theta-2k\pi$ and $\varphi-2k\pi$ are uniformly quantized between $$-\frac{\pi}{N} \text{ to } +\frac{\pi}{N},$$

where k is an integer and N is a positive non-zero integer.

14. The apparatus according to claim 13, wherein a value of the θ is the same as a value of the φ.

15. The apparatus according to claim 13, wherein the processor is configured to determine the third precoding matrix according to the first precoding matrix indicator, the second precoding matrix indicator, and the obtained RI, wherein the third precoding matrix is a product of the first precoding matrix and the second precoding matrix.

16. The apparatus according to claim 13, wherein the processor is configured to determine the third precoding matrix according to the first precoding matrix indicator, the second precoding matrix indicator, and the obtained RI, wherein the third precoding matrix is a matrix obtained by orthonormalizing a product of the first precoding matrix and the second precoding matrix.

* * * * *